Figure 1:
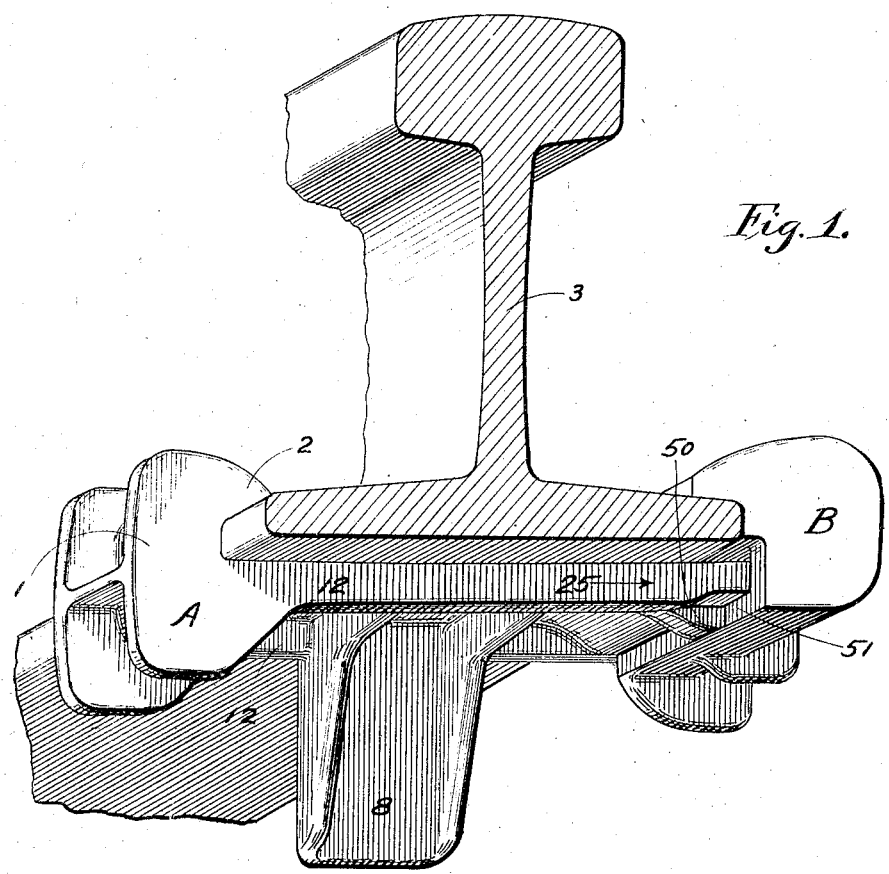

H. G. ELFBORG.
RAIL ANCHOR.
APPLICATION FILED JAN. 14, 1915.

1,176,280.

Patented Mar. 21, 1916.
5 SHEETS—SHEET 1.

Witnesses:
C. E. Burnap
Henry A. Parks

Inventor:
Henry G. Elfborg
By Sheridan, Wilkinson & Scott, Attys

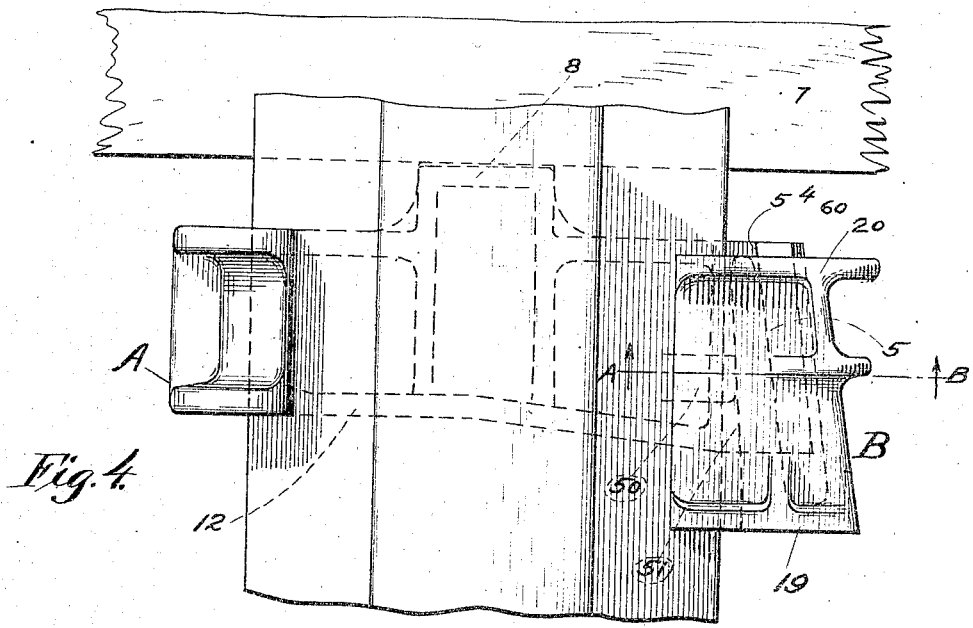
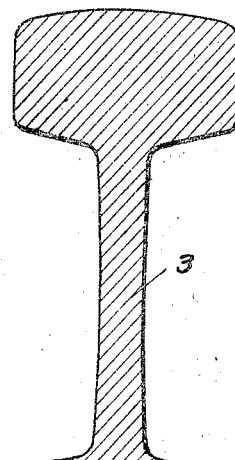
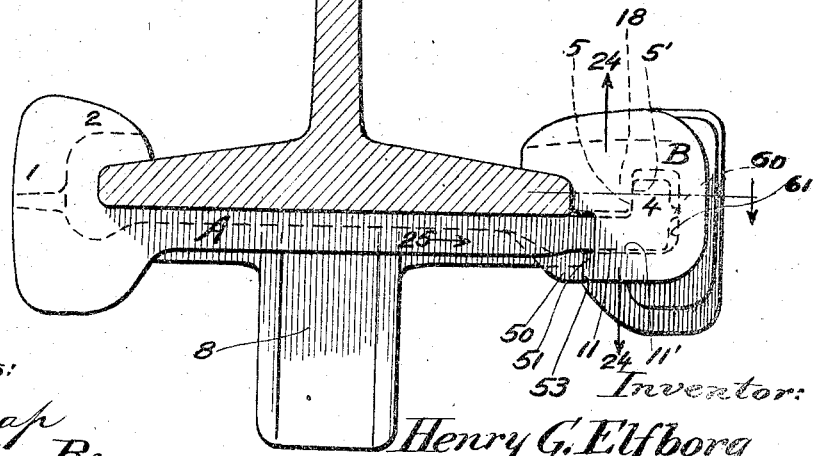

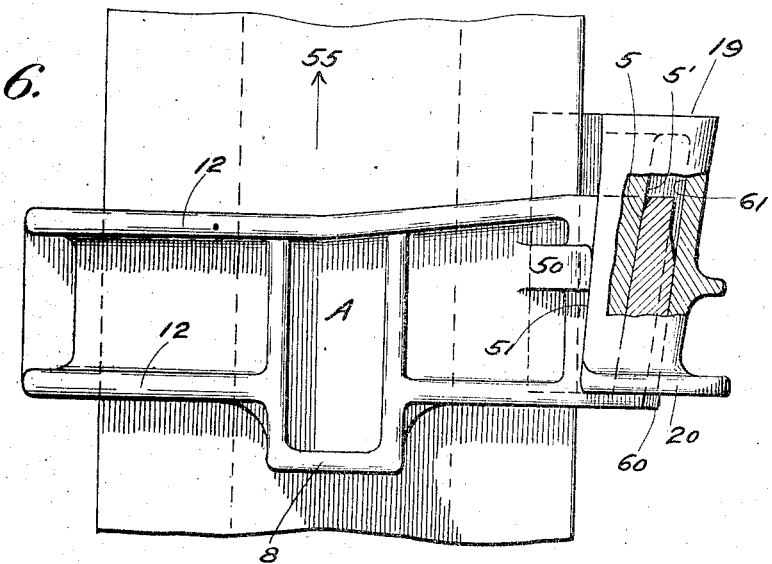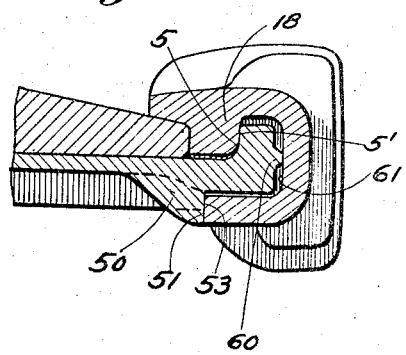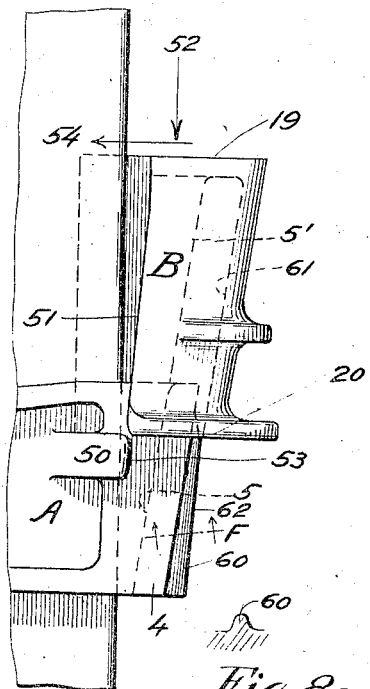

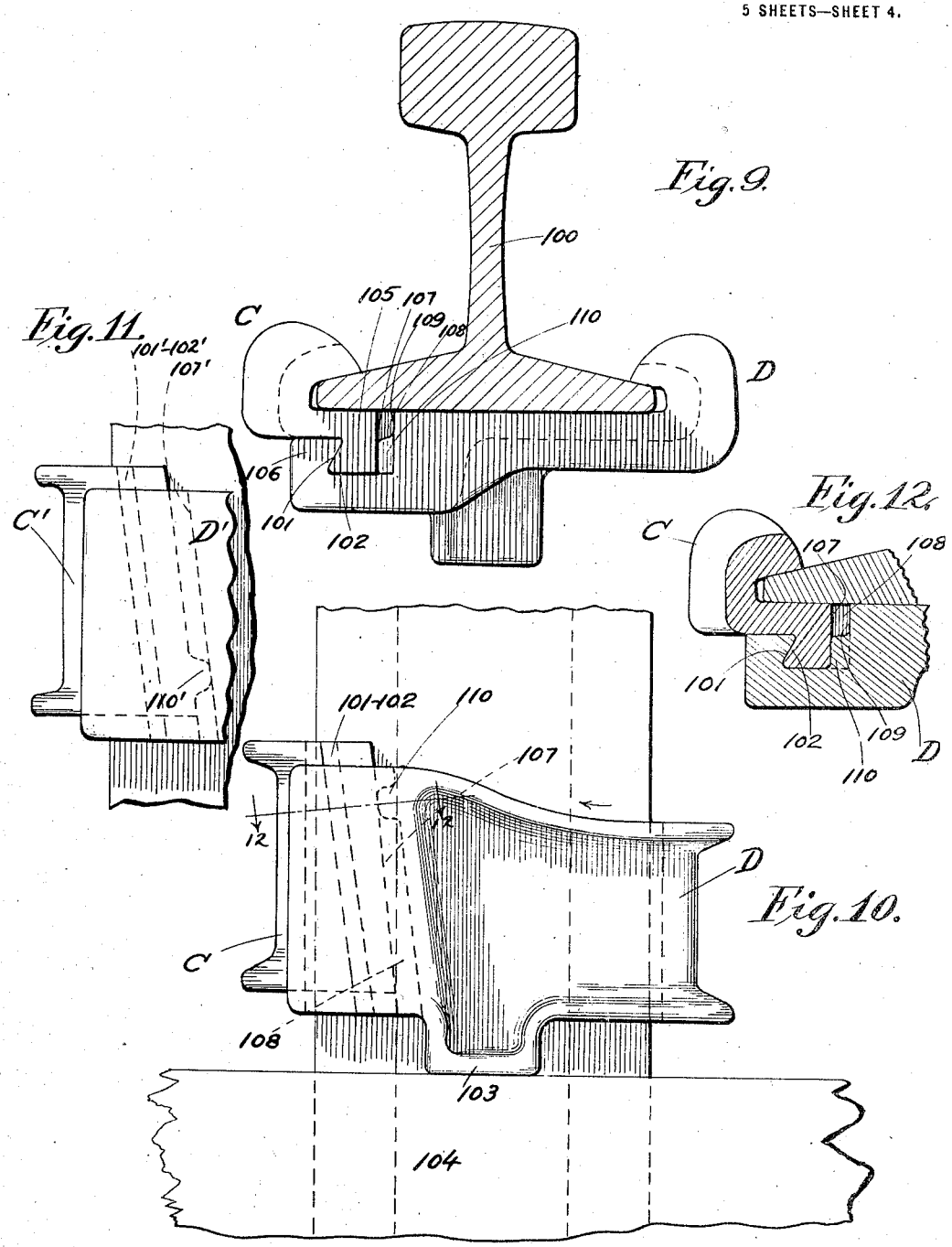

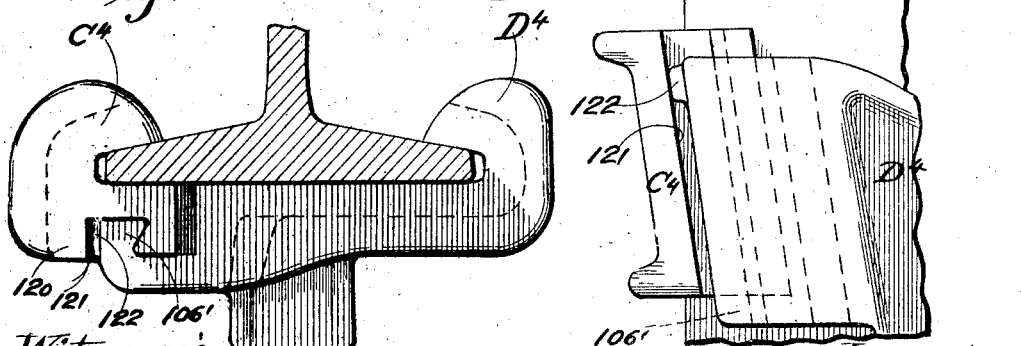

ized subject matter of the invention. -->

UNITED STATES PATENT OFFICE.

HENRY G. ELFBORG, OF CHICAGO, ILLINOIS.

RAIL-ANCHOR.

1,176,280.   Specification of Letters Patent.   Patented Mar. 21, 1916.

Application filed January 14, 1915. Serial No. 2,201.

*To all whom it may concern:*

Be it known that I, HENRY G. ELFBORG, a citizen of the United States, residing at Chicago, in the county of Cook and State of Illinois, have invented certain new and useful Improvements in Rail-Anchors, of which the following is a specification.

My invention is an improvement in devices for preventing the longitudinal movement or creeping of rails. Such devices, generally termed anti-creepers or rail anchors, as usually constructed comprise a device attached to the rail and abutting against or secured to a cross-tie. In the forms of these devices most commonly known the structure abuts against a cross-tie, thereby preventing movement of the rail relative to the tie and transmitting the force which tends to cause longitudinal movement to the cross-tie. The most convenient form of rail anchor is that in which the anchor consists of preferably two parts having interlocking engagement along a plane inclined to the longitudinal axis of the rail, whereby these parts when driven together are wedged tightly upon the rail, one of the parts being provided with a depending foot which abuts against a cross-tie. In operation the abutment of the depending foot against the cross-tie prevents movement of the rail relative to the tie, and at the same time the longitudinal force acting upon the rail tends to more firmly wedge the members of the anchor together, thereby increasing the frictional hold of the anchor upon the rail. An imperfection in the operation of most of these devices, however, arises from the fact that a change in temperature, through the expansion or contraction of the rails, caused thereby, frequently imparts movement to the rails, or parts thereof, in a direction opposite to the creeping caused by the principal movement of traffic; and in the case of tracks upon which traffic moves in both directions, the movement of traffic in one direction will tend to move the rails in a direction opposite to that which the anchors are designed to prevent. When movement in such opposite direction is imparted to a rail, the rail anchor is drawn away from the coacting tie instead of being thrust against it. If the parts of which the anchor is composed are held in fixed relative position and in firm engagement with the rail, no harm is caused by the anchor being drawn away from the coacting tie, inasmuch as it immediately resumes its position of abutment against the tie when normal conditions are restored. As a matter of fact, however, the parts of these anchors as generally constructed do not remain in fixed relative position, and do not retain their grip upon the rail when movement of the rail draws the anchor away from the coacting tie, but, on the contrary, such movement of the rail draws one part of the anchor away from the other and loosens the grip of the anchor upon the rail, thereby destroying its efficiency and rendering the anchor useless until again adjusted upon the rail.

The reason that the drawing of an anchor away from its tie destroys the gripping of the anchor upon the rail lies in the fact that the member of the anchor having the depending foot abutting against the tie and embedded in the ballast remains practically stationary, while the other member of the anchor, which is wedged upon the abutment member, moves away from the tie with the rail, thereby destroying the wedging grip of the anchor upon the rail. The most serious difficulty from this source arises, of course, in cold weather when the contraction of the rails is greatest, and when the depending foot of the abutment member of the anchor is embedded in ice, snow, and frozen ballast, thereby positively preventing its movement away from the tie. Under such circumstances, the other member of the anchor, having no part embedded in the ballast or ice, is drawn away from the coacting abutment member by reason of its frictional hold on the rail. By means of my invention I have remedied this condition by providing means whereby the coacting members of the anchor are locked together, thereby effectually preventing any such relative movement between the anchor members as above described.

Heretofore attempts have been made to lock the members of a rail anchor together by various devices, such as pins engaging the different parts of the anchor, ratchet teeth upon one member engaged by a spring-tooth or other means upon the other member, etc. None of these devices, however, completely remedies the defect above referred to. By means of my invention a much more secure locking of the two members together is brought about and such locking is accomplished effectively in any position of the members of the anchor relative to each other, thereby firmly locking the members of the anchor together at whatever point they are brought to rest when wedged together upon the rail base.

In addition to the interlocking inclined surfaces, or wedging surfaces, whereby the parts of the rail anchor are drawn into gripping engagement with the rail, I form the anchor members with other coacting parts or locking elements that engage each other as the driven member, or wedge member, is driven into place, and oppose a considerable degree of resistance to the driving into place of the wedge member. The overcoming of this resistance sets up a high degree of pressure approximately transversely of the rail between the locking elements, and prevents separation of the anchor members. The locking elements may consist of two coacting surfaces of suitable form, some provision being made whereby these surfaces, which normally are out of alinement when the parts are initially assembled ready for driving together, may yield sufficiently to permit the driving together of the two elements, and yet may offer sufficient resistance to set up a high degree of pressure between the elements of the anchor when driven into gripping position. The structure is so arranged that the pressure between the coacting locking surfaces acts either at a right angle, or at an angle not much less than 90° to the longitudinal axis of the rail, whereby the force acting between the locking surfaces has no component, or but a very slight component, acting longitudinally of the rail, that is, in a direction to cause separation of the members of the anchor. The yielding of the locking surfaces may be provided for either by making one or both of the surfaces of comparatively slight extent, e. g., in the form of a narrow rib or a short lug, and the yielding or bending of the metal may be relied upon to some extent to provide part of the yielding effect necessary to permit the locking surfaces which are normally out of alinement to engage and pass one another during the assemblage of the device. When one or both of the locking surfaces is made in the form of a norrow rib or short lug, the opposing surfaces will bite into each other, thereby providing wholly or partially for the necessary yielding.

From the foregoing it will be apparent that according to my invention I provide the anchor members with coacting, inclined, or wedging surfaces, whereby when driven together longitudinally of the rail, they are caused to move transversely of the rail into gripping engagement therewith, and that I further provide the elements of the anchor with normally interfering parts that resist the longitudinal relative movement of the members when being driven together, such resistance setting up the necessary pressure between the anchor members to effectually lock them together in any position at which they come to rest in gripping engagement with the rail. The resistance opposed by the locking elements is so arranged that one or both of the locking elements will yield sufficiently to permit the assemblage of the device, and will permit such assemblage without setting up injurious strains in the parts of the anchor which grip the rail, or in the parts of the anchor which coact to draw the members together upon the rail.

My invention can be applied to any rail anchor consisting of two or more parts and having provision for being drawn together upon a rail by the coaction of inclined or wedging surfaces which transform relative longitudinal movement of the surfaces into a transverse rail-gripping movement of the members of the anchor. It is only necessary that during movement of the members into gripping position, the movement of one of the members be resisted by contact with a part of the other member which yields under the force applied, thereby setting up a high degree of pressure approximately transversely of the rail between the contacting parts, such transverse pressure acting either vertically, horizontally, or in any intermediate direction, according to the disposition of the locking surfaces. An anchor so constructed comprises differently acting pairs of coacting surfaces, some inclined to draw the members together upon the rail and others so arranged as to set up a high degree of pressure approximately transversely of the rail when the members of the anchor are in rail gripping position.

I have illustrated one application of my invention in connection with a form of rail anchor described and claimed in my prior patents,—No. 1,083,603 of January 6, 1914, and No. 1,088,976 of March 3, 1914, and also in connection with another form of rail anchor. It will be understood, however, that the application of my invention is not confined to the particular forms of rail anchor herein illustrated and referred to, but that it may be applied to any rail anchor in which the parts are wedged together upon a rail base, that is, are brought into forcible engagement with the rail base by the coaction of inclined surfaces thereon.

Figures 2, 3:
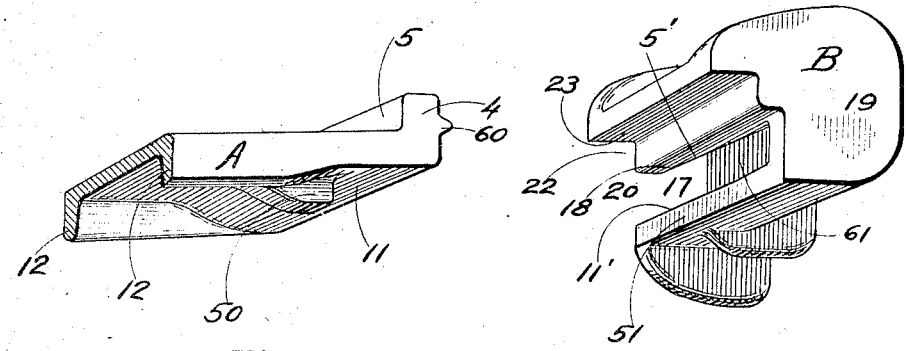

In the drawings,—Figure 1 is a perspective view of a form of rail anchor invented by me, as set forth in the patents above referred to and having my improved locking device embodied therein. Fig. 2 is a fragmetary perspective view of a part of the reach-bar or abutment member of this anchor, showing the part thereof upon which one of the locking elements is formed. Fig. 3 is a perspective view of the wedge member of the same anchor, in which is illustrated a coacting part of the locking device. Fig. 4 is a plan view of my improved rail anchor mounted upon a rail. Fig. 5 is a view in elevation of my improved anchor applied to a rail. Fig. 6 is a plan view, from beneath, of my improved anchor applied to a rail, parts being broken away to more clearly show the structure. Fig. 7 is a vertical, sectional view on the line A—B of Fig. 4. Fig. 8 is a fragmentary view similar to Fig. 6, showing the parts before the wedge member is driven into place. Fig. 8ª is a section on the line F of Fig. 8, showing the contour of the rib before the parts are driven together. Fig. 9 is a view in elevation, transversely of the rail, of my invention in connection with another form of rail anchor. Fig. 10 is a plan view, from beneath, of the structure shown in Fig. 9. Fig. 11 is a view similar to Fig. 10, but showing a somewhat different way of embodying my invention. Fig. 12 is a fragmentary cross-sectional view in elevation of the structure shown in Fig. 9. Fig. 13 is an elevational view similar to Fig. 9, but showing a different form of locking surface. Fig. 14 is a view, from beneath, of the structure shown in Fig. 13. Fig. 15 is a fragmentary cross-sectional view of the structure shown in Fig. 13. Fig. 16 shows a modification of the structure illustrated in Figs. 13 to 15. Fig. 17 is a framgentary cross-section on the line F of Fig. 16, of the locking rib of the structure shown in Figs. 13 to 16, showing the normal form of the rib before the parts are driven together. Fig. 18 is a view in elevation of another application of my invention, and Fig. 19 is a view, from beneath, of the structure shown in Fig. 18.

Before proceeding to a detailed description of my invention herein claimed, I will briefly describe the general construction of the anchor shown in Figs. 1 to 8, the same being more fully described, however, in my prior patents above referred to. The main member A, which for convenience may be termed the reach-bar or abutment member, is formed at one end with an upturned lip or jaw 1, inturned at 2 to embrace the edge and part of the upper surface of the rail base. This member A extends beneath and in contact with the lower surface of the base of a rail 3, and projects beyond the opposite edge of the rail base. At the end of the reach-bar A, opposite the jaw 1—2, there is an upstanding shoulder 4, the inner, substantially vertical face 5 of which inclines toward the edge of the rail base in the direction of the adjacent tie 7, as clearly shown in Fig. 4, against which the downwardly extending abutment member 8 of the reach-bar is adapted to bear. The underside of the end of the reach-bar A, opposite the jaw 1—2, is provided with a surface 11, which inclines downwardly toward the adjacent tie 7, and preferably the member A is provided with strengthening ribs 12. The smaller or wedge member B has in a general way the form of a box open along one side, and at one end. The opening or slot 17 along the side of the wedge member has its lower face 11' inclined to correspond to the inclination 11 on the lower side of the wedge end of the main member or reach-bar A. From the upper wall of the opening or slot 17, along the side of the wedge member, there depends a lip or wall 18, having along its inner face an inclined surface 5' corresponding in inclination to the inclined surface 5 upon the main member A. The wedge member is preferably closed at the end 19, but at the opposite end 20 the slot 17 is open, and the wedge member is recessed at 22 above the opening 17, forming the lip 23, adapted to overlie the edge of the rail base.

In assembling the device, the member A is placed under the rail with its lip or jaw 1—2 embracing one edge of the base thereof and with the abutment 8 against one of the ties, the device being placed on that side of the tie from which the greatest volume of traffic moves. The member B is then mounted on the member A by passing the open end 20 of said member B over the wedge end of member A, with the surface 5 coacting with the surface 5' and the surface 11 coacting with the surface 11'. The coaction between the surfaces 5 and 5' causes the rail base to be gripped transversely between the wedge member B and the upstanding lip or jaw 1—2 at the opposite end of the member A. The coaction between the surfaces 11 and 11', when the wedge member B is impelled toward the tie, has the effect of forcing or drawing the main member A upward toward the rail by reason of the fact that the lip 23 of the wedge member overlies the edge of the rail base while the surface 11' inclined downwardly toward the tie forces the main member A upward, as the wedge member moves toward the tie. In practice the members A and B are castings having unfinished wedging surfaces so that in the initial assemblage, the abutment 8 upon the main member bearing against a tie toward which the traffic is moving, the movement of the wedge member B when forced toward the tie may, owing to the roughness or irregularity of the said coacting surfaces, cause the wedging surface 5' to seat and bind on the wedging surface 5, gripping the rail longitudinally, before the other wedging surface 11' on the wedge member has seated on the surface 11 on the main member and has forced the main member into binding contact with the under surface of the rail. At this period in the adjustment of the anti-creeper, a transverse pressure only will be exerted on the lateral edges of the rail base. When the wedge member is driven farther toward the tie it will have the effect of stretching or extending the main member A in the direction of the arrow 25 in Fig. 5 by virtue of the elasticity of the material of which it is constructed, and may also bend the shoulder 4 outwardly until the wedging surface 11′ has seated on the surface 11, at which stage in the adjustment a vertically acting pressure will be set up between the member A and the rail, the creeping of the rail thus being retarded by the frictional resistance on the bottom thereof as well as by the horizontal gripping of the edges of the base. On the other hand, should the wedging surface 11′ seat and grip the rail vertically first, the wedge member when driven further toward the tie will cause a spreading apart of said wedge member in the direction of the arrows 24 in Fig. 5, which further movement of the wedge member B toward the tie causes the wedging surface 5′ to seat on the surface 5 on the main member A, thereby causing a transverse gripping of the base of the rail.

The foregoing is a brief description of the rail anchor described in my prior patents above referred to. My present invention relates to means for locking the members of the anchor together for the purpose hereinbefore described. To this end I provide a depending lug 50 upon the under side of the main member or reach-bar A, adapted to coact with the surface 51 below the opening 17 in the member B, not for the purpose of merely preventing displacement of member B from its proper position by a rotational movement on an axis parallel to the rail axis, but to provide a locking engagement. Upon reference to Figs. 4, 6 and 8, it will be seen that surface 51 is inclined to the rail axis at substantially the same angle as wedging surfaces 5, 5′, i. e., that surface 51 is substantially parallel to surfaces 5, 5′. Instead of forming surface 51 precisely parallel to wedging surfaces 5, 5′, there may be a convergence of these surfaces toward the tie as illustrated. In Fig. 8 the wedge member B has been placed in starting position upon the reach-bar A, ready to be driven by a hammer in the direction of the arrow 52, to grip the rail base between the two members of the anchor. As shown in Fig. 8, the surface 51, at the end 20, of the wedge member B is out of alinement and interferes with the outer surface or end 53 of the lug 50 and when member B is driven on to member A in the direction indicated by the arrow in Fig. 8, the lug 50 bites into the surface 51, or the surface 51 cuts into the lug 50, the surfaces 51 of the member B and 53 on the end of the lug 50 being thereby so tightly engaged together as to prevent relative movement of the members A and B after they have been driven together. In some instances, in addition to the biting into each other of the surfaces 51 and 53, a bending and stretching action may be imposed upon the members A and B by the resistance of the lug 50 to the movement of the part B when driven into engagement with the member A and rail base. The yielding of the locking elements is sufficient to accommodate the application of the anchor to rails of considerable difference in size, and also has the other functions and advantages herein described. Inasmuch as the member B when driven in the direction of the arrow 52 is given a transverse movement in the direction of the arrow 54 by the coaction of surfaces 5, 5′, the resistance of the lug 50 to the movement of the member B would increase as member B was driven in the direction of arrow 52, unless special means were adopted to preserve a substantially constant relation between lug 50 and surface 51. I maintain such a substantially constant relation by the inclination of the surface 51 above referred to.

The surfaces 51 and 53 are out of alinement and interfere to a certain extent when the parts are in the position shown in Fig. 8, and substantially the same relation will preferably be preserved throughout the movement of the member B from the position shown in Fig. 8 to that shown in Fig. 6, by reason of the fact that the surface 51 slopes away from the lug 50 at substantially the same rate that the member B is moved transversely of the rail toward the lug 50 by the coaction of the surfaces 5, 5′. As above stated, however, I prefer, especially for the purpose of facilitating a second application of the anchor, which is necessary when a new rail is substituted for a defective one, to make the surface 51 converge slightly with the surfaces 5, 5′ in the direction of the tie, thus causing a slight increase in the pressure between lug 50 and surface 51 as the wedge member B is driven further home. By this means the parts A and B are securely locked together, whether, owing to variations in width of rail base or other cause, the parts of the anchor come into gripping engagement with the rail in the position shown in Fig. 6, or in some position intermediate between the positions shown in Figs. 6 and 8. By the means described the surfaces 51 of the part B, and 53 on the end of the lug 50 on the part A, are kept in substantially constant relation to each other transversely of the rail regardless of the amount of relative transverse movement of the parts A and B, and in operation the parts of the anchor are securely locked together by direct engagement with each other. Through the coacting surfaces 5, 5′ the members A and B are pulled together into wedging engagement with the rail base. The engagement of the surface 51 with the lug 50, due to the slight interference of these parts, opposes a certain amount of resistance at this point to the approach of the members of the anchor toward each other. The end 53 of the lug 50 is, however, preferably made of small extent. The extent of the surface in actual engagement is therefore comparatively small and the metal abrades sufficiently to permit assemblage of the parts and some slight yielding by bending may also take place. The surfaces 5, 5' being of comparatively large extent, the wedging force set up by driving the wedge member B longitudinally is sufficient to overcome the resistance due to the overlapping of the locking surfaces 51 and 53, the engagement of which locks the parts together so securely that even when sufficient force is applied to the anchor in the direction of the arrow 50 in Fig. 6 to move it longitudinally of the rail, such movement takes place without separating the parts A and B and without impairing their grip upon the rail. The metal is so distributed that yielding of the locking elements takes place before injurious strains are imposed upon the wedging and rail-gripping parts of the anchor.

While I have above described my locking device as applied to a rail anchor of my own invention in which the rail is gripped both longitudinally and vertically, it will be apparent that the locking device is not dependent upon the double gripping of the rail and is applicable to any of the anchors in which the rail is gripped transversely by the action of wedges or inclined surfaces, there being a great variety of such anchors, some consisting of two members having the wedging surfaces formed thereon, and some consisting of more than two members and having wedges separate from the rail gripping members. It will also be apparent that the surface 51 and the lug 50 may be reversed in position, i. e., that the extended surface 51 might be formed on member A and the lug 50 on member B, such a reversal being illustrated in connection with the form of rail anchor shown in Figs. 9 to 12, in connection with another form of anchor.

Among the advantages secured by such convergence of the wedging and locking surfaces referred to above and shown in Fig. 8 of the drawings and in other views is the fact that it facilitates a second use or reapplication of the anchor after it is removed from a rail which is to be replaced for any cause. The application of such an anchor to a rail is liable to cause some stretching of the parts, rendering it necessary to drive the wedge member farther toward the tie to obtain a secure hold upon the second application. By imparting the convergence of the locking surface 51 with the wedging plane 5—5', as above referred to, when the anchor is applied a second time a secure gripping may be obtained by simply driving the wedge member B farther toward the tie, thereby compensating for any stretching which has taken place, and at the same time an effectual locking of the parts together is obtained by the fact that the convergence of the locking surface 51 with the plane of the surfaces 5—5' increases the interference of the locking elements 50—51 sufficiently to bring them into forcible engagement even in a slightly stretched condition of the members of the anchor. Under some circumstances, however, a sufficiently efficient operation of the device might be obtained even with the locking surface 51 parallel to the axis of the rail, but in such event it would be necessary to limit the period of engagement between the lug 50 and locking surface 51 to a comparatively short interval occurring at the time the wedging member B reaches its home position where tight gripping of the rail is obtained. A longer period of engagement with the locking surface 51 when parallel to the axis of the rail would be likely to result in causing an injuriously high degree of pressure between the lug 50 and surface 51.

In the form of my device illustrated in Figs. 1 to 8ª I have shown another means of locking the anchor members together, the same consisting of a narrow rib 60 designed to coact with the inner wall 61 of the member B. The outer surface 62 of the rib 60 slopes outwardly to a slight extent relative to the plane of the wall 61, thereby opposing a slightly increased resistance to the movement of the part B as it approaches its home position, such slightly increased resistance being effective for the same purpose as explained in connection with the increased resistance between the locking lug 50 and surface 51. A further advantage of the rib 60, in addition to its locking function, is that by means of the rib a fit of the part B around the end of the reach-bar A can thereby be secured without the utmost precision in manufacture, inasmuch as the rib 60 is narrow and is made of such depth that it slightly interferes with the inner surface 61 of the member B, which when driven into place bites into the rib 60, thereby insuring a close engagement of the parts. In Fig. 8ª I have shown the normal cross-section of the rib 60, the same being slightly flattened by the assemblage of the device as shown in Figs. 5, 6 and 7. It will be understood that the locking elements 50—51 may be used independently of the rib 60, or vice versa, and that the coaction of the rib 60 with the surface 61 in itself sets up a locking engagement between the parts. I prefer, however, in this particular form of anchor to use both the elements 50—51 and the rib 60 coacting with the surface 61.

In Figs. 9—10 and 12 I have shown my invention applied to another form of rail anchor consisting of two members C and D, provided with jaws to engage the edges of the base of the rail 100, and with interlocking inclined surfaces 101 and 102 whereby the members C and D engage each other beneath the rail base. The member D is provided with an abutment 103 adapted to bear against a cross-tie 104. The inclined interlocking surfaces 101—102 lie in a plane which inclines toward the longitudinal axis of the rail in a direction toward the tie 104, as clearly appears from Fig. 10. While for convenience I define the inclination as a convergence toward the axis of the rail in a direction toward the tie, it is obvious that if members C and D interlocked on the opposite side of the center of the rail the convergence would be in the opposite direction. The interlocking engagement of the surfaces 101—102 is provided by forming a downwardly extending rib 105 on the member C, and by forming the member D with a hook-shaped extension 106 which extends beneath, then upwardly in contact with the outer, inclined side of the downwardly extending rib 105. The inner surface 107 of the downwardly extending rib 105 converges with the longitudinal axis of the rail in a direction toward the tie, but at an angle less than the angle of convergence of the wedging surfaces 101—102. A clearance space 108 extends between the surface 107 and the opposite surface 109 on the member D. The member D is provided with a lug 110 which extends outwardly from the surface 109 to a distance sufficient to slightly interfere with the surface 107 when the parts are initially assembled preparatory to being driven into place. The device is assembled by placing the part D beneath the rail with its jaw in engagement with one edge of the base thereof, and its abutment 103 against the tie. The part C is then placed over the opposite edge of the rail and moved longitudinally toward the tie until the downwardly projecting rib 105 enters the space between the projection 106 and the surface 109 upon the member D. The member C is then driven toward the tie by means of a hammer, thus causing the members C and D to be drawn toward each other into gripping engagement with the rail by the coaction of the inclined wedging surfaces 101—102. The longitudinal movement of the member C is however resisted by the lug 110 which normally lies in the path of the downwardly projecting rib 105 by reason of the fact that the lug 110 normally interferes with the surface 107 of the rib 105. The force applied in driving the member C into place however causes the lug 110 and surface 107 to bite into each other sufficiently to permit the necessary longitudinal movement of the part C, and under some conditions the necessary yielding to permit longitudinal movement of the part C may be brought about by a slight stretching or bending of the metal of which the members C and D are composed.

In Fig. 11 I have shown a fragmentary view from beneath of my invention applied in a slightly different manner to the anchor illustrated in Figs. 9—10 and 12. In this instance the lug 110' is formed upon the member C' and coacts with an inclined surface 107' formed on the member D'. In this application of my invention I have also shown another slight variation in that the locking surface 107' is parallel to the inclined wedging surfaces 101'—102'.

In Figs. 13—14 and 15 I have illustrated a rail anchor of the same general type and mode of operation as that shown in Figs. 9 to 12, but instead of a short locking lug upon one member coacting with an extended surface on the other member, I have shown upon the member $D^2$ a rib 112 of practically the same longitudinal extent as the coacting surface 113, the rib 112 being comparatively thin so as to provide the necessary yielding to permit assemblage of the elements. By reason of the narrowness of the rib 112 it will readily bite into the surface 113, and itself be bitten into by the surface 113. In this instance, as in the form of the device shown in Fig. 11, I have shown the coacting surfaces parallel to the wedging surfaces 115—116, such parallelism being quite admissible where new parts of both members come into play with each increment of movement of the member $C^2$ toward the tie. In case of a second application of an anchor which has stretched, thereby necessitating that the parts be driven farther together to grip the rail, new locking surfaces are thereby brought into place, thus lessening the necessity of having the locking surfaces and wedging surfaces converge for the purpose of increasing the transverse interference between them as the members are driven farther together.

In Fig. 16 I have indicated a construction of the device shown in Figs. 13 to 15, in which the thin locking rib 112' is placed upon the member $C^3$ instead of upon the coacting member. Fig. 17 shows a cross-section of the ribs 112 and 112' before the parts have been driven together, that is, showing the rounded contour at the apex as distinguished from the flattened contour appearing in Figs. 13 and 15, as a result of the parts being driven together.

In Figs. 18 and 19 I have shown a still further mode of applying my invention to rail anchors of the type illustrated in Figs. 9 to 16. In this mode of applying my invention the member $C^4$ is provided upon its under side with a downwardly extending rib 120 formed on its inner face with an inclined locking surface 121 adapted to coact with a lug 122 formed upon the upwardly extending part 106' of the member D⁴.

It will be apparent from the foregoing that the principle of my invention may be embodied in a great multiplicity of different forms, and that the specific embodiments thereof herein described are intended merely as illustrations of modes of applying my invention such as will form a sufficient guide for the application of my invention to any of those rail anchors which are caused to grip the base of a rail either vertically or horizontally, or both vertically and horizontally, by the wedging coaction of a plurality of members.

I claim:—

1. A rail anchor comprising a plurality of members having coacting inclined wedging surfaces to draw said members together transversely as relative longitudinal movement is imparted to them, coacting locking elements upon said members, one of said locking elements sloping away from the other transversely of the rail.

2. A rail anchor comprising a plurality of members having coacting inclined wedging surfaces to draw said members together transversely as relative longitudinal movement is imparted to them, coacting locking elements upon said members, one of said locking elements sloping away from the other transversely of the rail, but at a lesser angle than the inclination of said wedging surfaces.

3. A rail anchor comprising members having coacting wedging surfaces inclined to the longitudinal axis of the rail for transforming relative longitudinal movement into transverse rail-gripping movement, said anchor also having coacting locking elements to which is imparted a relative longitudinal and transverse movement by the relative movement of said wedging surfaces, one of said locking elements being inclined to the longitudinal axis of the rail.

4. A rail anchor comprising members having coacting wedging surfaces inclined to the longitudinal axis of the rail for transforming relative longitudinal movement into transverse rail-gripping movement, said anchor also having coacting locking elements to which is imparted a relative longitudinal and transverse movement by the relative movement of said wedging surfaces, one of said locking elements being inclined to the longitudinal axis of the rail at a different angle from the inclination of said wedging surfaces.

5. A rail anchor adapted to engage a tie and consisting of a plurality of members having wedging engagement upon a plane which is inclined to the axis of the rail and having locking engagement along a surface inclined at a lesser degree to the axis of the rail, said locking engagement being between parts which are normally out of alinement.

6. A rail anchor for railroad rails comprising one member adapted to underlie and engage one edge of the base of a rail and to bear against a tie, the other end of said member having an upwardly extending shoulder inclined to the longitudinal axis of the rail to form a wedging surface, said member having a locking surface upon its under side, a second member having a groove in one of its sides having a depending wall provided with an inclined wedging surface adapted to coact with said first-mentioned wedging surface, said second member having also a locking surface adapted to coact with said first-mentioned locking surface, said locking surfaces being normally out of alinement and being adapted to yield when said first and second members are driven together with their wedging surfaces in engagement.

7. A rail anchor for railroad rails comprising one member adapted to underlie and engage one edge of the base of a rail and to bear against a tie, the other end of said member having an upwardly extending shoulder inclined to the longitudinal axis of the rail to form a wedging surface, said member having a locking surface upon its under side, a second member having a groove in one of its sides having a depending wall provided with an inclined wedging surface adapted to co-act with said first-mentioned wedging surface, said second member having also a locking surface adapted to coact with said first-mentioned locking surface, said locking surfaces coacting along a plane inclined to the axis of the rail.

8. A rail anchor for railroad rails comprising one member adapted to underlie and engage one edge of the base of a rail and to bear against a tie, the other end of said member having an upwardly extending shoulder inclined to the longitudinal axis of the rail to form a wedging surface, said member having a locking surface upon its under side, a second member having a groove in one of its sides having a depending wall provided with an inclined wedging surface adapted to coact with said first-mentioned wedging surface, said second member having also a locking surface adapted to coact with said first-mentioned locking surface, said locking surfaces coacting along a plane inclined to the axis of the rail, said inclination being at a lesser angle than the inclination of said wedging surfaces.

9. A rail anchor for railroad rails comprising one member adapted to underlie and engage one edge of the base of a rail and to bear against a tie, the other end of said member having an upwardly extending shoulder inclined to the longitudinal axis of the rail to form a wedging surface, said member having also a wedging surface on its under side inclined downwardly toward said tie and having a locking surface adjacent the inner boundary of said inclined under surface, and a second member having a groove in its side and provided with two inclined wedging surfaces adapted to coact with the wedging surfaces on said first member and having also a locking surface adapted to coact with said first-mentioned locking surface, said locking surfaces being normally out of alinement and being adapted to yield when said first and second members are driven together with their wedging surfaces in engagement.

10. A rail anchor for railroad rails comprising one member adapted to underlie and engage one edge of the base of a rail and to bear against a tie, the other end of said member having an upwardly extending shoulder inclined to the longitudinal axis of the rail to form a wedging surface, said member having also a wedging surface on its under side inclined downwardly toward said tie and having a locking surface adjacent the inner boundary of said inclined under surface, and a second member having a groove in its side and provided with two inclined wedging surfaces adapted to coact with the wedging surfaces on said first member and having also a locking surface adapted to coact with said first-mentioned locking surface, said locking surfaces coacting along a plane inclined to the axis of the rail.

11. A rail anchor for railroad rails comprising one member adapted to underlie and engage one edge of the base of a rail and to bear against a tie, the other end of said member having an upwardly extending shoulder inclined to the longitudinal axis of the rail to form a wedging surface, said member having also a wedging surface on its under side inclined downwardly toward said tie and having a locking surface adjacent the inner boundary of said inclined under surface, and a second member having a groove in its side and provided with two inclined wedging surfaces adapted to coact with the wedging surfaces on said first member, and having also a locking surface adapted to coact with said first-mentioned locking surface, said locking surfaces coacting along a plane inclined to the axis of the rail, said inclination being at a lesser angle than the inclination of said wedging surfaces.

In testimony whereof, I have subscribed my name.

HENRY G. ELFBORG.

Witnesses:
GLEN E. SMITH,
HENRY A. PARKS.